United States Patent [19]
Cole, Jr.

[11] 4,169,037
[45] Sep. 25, 1979

[54] ENTRANCE BUSHING

[75] Inventor: Ernest A. Cole, Jr., Houston, Tex.

[73] Assignee: Petrolite Corporation, St. Louis, Mo.

[21] Appl. No.: 949,281

[22] Filed: Oct. 6, 1978

[51] Int. Cl.² .............................. B03C 5/02; H01B 7/34
[52] U.S. Cl. .................................... 204/308; 204/302;
 174/11 BH; 174/15 BH
[58] Field of Search ............ 204/302, 308 (U.S. only);
 174/11 BH, 15 BH

[56] References Cited
U.S. PATENT DOCUMENTS

| | | | |
|---|---|---|---|
| 3,666,878 | 5/1972 | Turner | 174/18 X |
| 3,926,774 | 12/1975 | Watson et al. | 204/308 |

*Primary Examiner*—Howard S. Williams
*Attorney, Agent, or Firm*—Sidney B. Ring; Hyman F. Glass

[57] ABSTRACT

A high pressure, high voltage entrance bushing member using taper-sealing between an insulating plastic plug and a metal barrel. Spring loading, as by means of a spring lock washer, is used to urge the taper connections into precompression for proper high pressure fluid-tight seal. Dimensional changes due to temperature variations are accommodated by the taper connections. The high pressure bushing member is used in conjunction with a high temperature, high voltage bushing member, being connected by a conductor extending axially through a high pressure conduit containing a dielectric liquid. The overall entrance bushing assembly is employed in a system for electrically resolving emulsions. In such systems, the dielectric liquid is maintained at the same pressure as the emulsion being treated by means of a dynamic fluid barrier which prevents the intermingling of these liquids.

6 Claims, 4 Drawing Figures

ENTRANCE BUSHING

BACKGROUND OF THE INVENTION

This invention relates to a system for electrically treating emulsions and to a high pressure, high temperature, high voltage entrance bushing, which may be used for carrying electric current from an external power source to energized electrodes through a metal sidewall of a vessel used in the electrical treatment of an emulsion. More particularly, the invention relates to the high pressure end of such an entrance bushing.

Electric treaters have been employed for many years for resolving emulsions formed of immiscible external and internal liquid phases. Usually the external phase is oil-continuous, and the internal phase is a dispersed aqueous contaminating substance. The term "oil" includes various types of materials such as petroleum and its products, and various types of organic liquids. The internal phase is aqueous and can be a caustic or acid solution. One of the most common emulsions which is resolved in electric treaters is water-in-crude oil. For purposes of removing salt, the crude oil is mixed with a quantity of dispersed fresh water. A high voltage electrical field resolves the emulsion by coalescing the internal phase into a bulk phase (carrying removed salt) which separates by gravity from the continuous external crude oil phase. The terms resolution and coalescence are used in their general meanings to denote the agglomeration of the dispersed internal phase in the continuous external phase.

Conventional electric treaters have employed high voltage from external power sources of 11 to about 33 kilovolts applied to electrodes that create the electrical field. However, energizing potentials of other values have been used in certain applications. The spacing between the electrodes defining the electric field produces voltage gradients in the range of about 2.5 kilovolts to about 8.5 kilovolts per inch of spacing.

Electric treaters employed for resolving emulsions have relatively similar constructions. The treater generally employs a pressure-type metal vessel which contains an inlet for introducing the emulsion and outlets to remove the continuous phase and the coalesced internal phase. In addition, the vessel contains electrodes for creating the electrical field. One or more energized electrodes can be suspended within the vessel but are electrically isolated from its metal sidewalls. The electrical current, from an external power source, is carried to the energized electrodes through the metal sidewall of the vessel by an electrical insulating device which is termed an "entrance bushing". The entrance bushing has metal parts to integrally connect with the sidewall of the vessel; and also it has insulating components to pass the electrical current in electrical isolation through the metal sidewall of the vessel to the energized electrode. The entrance bushing must provide the necessary electrical interconnection and a liquid-tight seal at the metal sidewall of the vessel under the temperature-pressure environment in which the emulsion is resolved within the vessel.

Prior constructions of the entrance bushing have withstood moderate temperatures and pressures of the emulsion within the vessel while conducting high potential current to the energized electrode. Present state of the art techniques require that the insulating components of the entrance bushing are formed of polymer-type insulating plastic materials such as Teflon. Entrance bushings with these plastic materials provide exceptional service in commercial applications on electric treaters for resolving emulsions. For example, entrance bushings shown in U.S. Pat. Nos. 2,881,125, 3,085,128, 3,303,262, and 3,666,878 have provided outstanding operational life and safety characteristics. These bushings are exceptional in design in that they operate under exceptional environments where subjected simultaneously to temperatures as high as 400° F. and fluid pressures up to 150 psi during normal operation of the electric treater.

Present day operation of electric treaters, of the nature employed in refineries, is placing a heavy burden upon even these entrance bushings. The temperature and pressure of the emulsion being resolved in electric treaters have steadily increased in the recent decade. Operating conditions are being approached which the plastic insulating materials of the entrance bushing cannot withstand in terms of operational life and maintenance of high safety characteristics. In one particular oil refinery, the heating, electrical field desalting and distillation process steps are arranged to conserve heat energy. For this purpose, the crude oil is heated to substantial temperatures (e.g. 375° F.) upstream of the electric treater by heat exchange with the products of distillation and other petroleum thermal treating procedures. In some instances, the oil refinery could be even more efficiently operated if the crude oil before passing through the electrical treater for desalting or dehydration purposes could be heated to temperatures approaching 500° F. These severe temperatures require very high pressures of 500 psi or more to maintain the crude oil within a liquid phase condition in the electric treater. The plastic insulating material, especially Teflon, has excellent mechanical and electrical properties. However, the design of an entrance bushing to withstand these exceptionally elevated temperatures and high pressures becomes a serious task so that the present outstanding operational life and safety characteristics of entrance bushings can be maintained.

Entrance bushings constructed with proper plastic insulating material can withstand very high operating pressure in the range of several thousand psi where the temperatures are relatively low, for example, ambient temperature of 60°–80° F. Alternatively, these bushings can withstand relatively high temperatures of up to about 500° F. where the operating pressure is relatively low, for example, 15 psi differential across the plastic insulating material. In either case, the plastic insulating material can be used within an entrance bushing and safely isolate electrical potentials up to 50 kilovolts (ac-dc) for extended periods of time and in complete safety.

Designing entrance bushings incorporating plastic insulating material is very difficult when such a device must withstand simultaneously elevated operating pressures (500 psi) and temperatures (500° F.). Teflon is typical of a number of high electrical resistance plastic materials which are subject to plastic flow upon increase in temperature and pressure. At elevated temperatures, these insulating materials are subject to plastic flow when subjected simultaneously to high operating pressures.

In the conventional entrance bushing, the plastic insulating material projects as a tubular member into the vessel containing the emulsion. Lower and upper fluid seals prevent the escape of emulsion from the vessel through the internal parts of the entrance bushing. For example, the upper portion of the tubular member of the plastic is carried in a metal adapter which is mounted in the sidewall of the vessel. The insulating material has a thermal expansion coefficient several times that of the metal (steel) components of the entrance bushing. Also, this insulating material in the cycling of operating temperatures, retains the structure induced at the maximum temperature. A sustantial temperature gradient established along the tubular member and across metal parts which form fluid seals creates severe longitudinal stresses to produce seal failure. Emulsion leakage into the entrance bushing results with entry into the metal conduit which contains the electrical conductor connecting to the external power source. An electrical arc may then occur which can destroy the electrical conductor, the entrance bushing, or both. Although electrical treaters carry devices to disconnect the electrical current from the energized electrode upon such an arc, substantial repairs are usually necessary to place the electric treater into operation. Thus, as the emulsion within the electric treater increases simultaneously in both pressure and temperature, designing an adequate entrance bushing which can be operated continuously in a high degree of safety becomes a difficult challenge. Thus, systems to remove the bushing from such environment may be utilized such as shown in U.S. Pat. No. 3,719,584.

Ideally, the system with the electrical treater functions such that the entrance bushing within the vessel can operate without suffering both high temperatures and high pressures.

In U.S. Pat. No. 3,926,774 to Watson and Winslow, an electrical treater system is disclosed adapted for resolving emulsions in a high temperature, high pressure environment. Such electric treater system includes a vessel for containing the emulsion while subjected to an electric field created by electrode means, including an energized electrode mounted in electrical isolation from the vessel. A high voltage bushing mounted within the sidewall of the vessel has an elongated tubular member projecting into the vessel and immersed within the emulsion. This tubular member, of a high electrical resistance, plastic insulating material, is subject to plastic flow upon increase in temperature and pressure. A conductor extends through the tubular member and connects at its vessels interior end to the energized electrode. The tubular member at its other end is carried in fluid-tight relationship in a metal adapter mounted in the sidewall of the vessel. A heat sink means is associated with the adapter for maintaining the length of the tubular member at substantially the same temperature as the emulsion. An aperture in the metal adapter passes the conductor to the exterior of the vessel. A pressure conduit extends in fluid-tight relationship from the metal adapter to an external power source having a high voltage output. A high pressure, high voltage feed-through insulator means seals the pressure conduit at the external power source. An interconnecting high voltage conductor within a dielectric liquid is carried in electrical isolation within the pressure conduit and connects between the conductor in the entrance bushing and the high voltage output of the external power source through the feed-through insulator means. A system means maintains the dielectric liquid at substantially the same pressure as the emulsion within the vessel. This system means includes a dynamic fluid barrier for preventing intermingling of the emulsion and dielectric liquid. Heat exchanger means on the pressure conduit maintain the high pressure, high voltage feed-through insulator means at substantially the same temperature at its pressure conduit and power source terminals.

In the system of U.S. Pat. No. 3,926,774, neither the high temperature entrance bushing nor the high pressure feed-through insulator is required to withstand elevated pressures and high temperatures simultaneously. In the high temperature entrance bushing, the fluid-tight seal between the tubular member and the metal adapter is exposed to only insignificant pressure differentials. The tubular member is maintained at substantially the same temperature throughout its length, and that temperature is substantially that of the emulsion in the treating vessel. The feed-through insulator adjacent the external power source withstands the full pressure of the emulsion within the vessel. However, the insulator is maintained at the same (ambient) temperature at its pressure conduit and high voltage output ends.

For example, the high temperature entrance bushing can operate under conditions which impose a temperature of 500° F. while suffering practically no pressure differential between the emulsion within the treating vessel and the dielectric liquid within the pressure conduit. The high pressure feed-through insulator may contain a fluid pressure of 500 pounds per square inch while being maintained at ambient temperatures of about 80° F. This separation of the temperature and pressure operating conditions at the entrance bushing and feed-through insulator permits of a system which can operate at elevated temperatures and high pressures with the same safety as if the system were operated with a single entrance bushing or insulator containing essentially zero fluid pressure at ambient temperatures. Thus, the outstanding safety and operating records of earlier entrance bushings employed in electric field treaters are maintained for operating conditions of temperature and pressure greatly in excess of those heretofore encountered in oil refineries and other installations by using the electric treater system of U.S. Pat. No. 3,926,774.

While the entrance bushing arrangement, including the feed-through insulator of U.S. Pat. No. 3,926,774, has the advantages described above, it is not sufficiently compact so that it can be shop assembled, tested, shipped and installed as a unit.

It is accordingly an object of this invention to provide a high pressure, high temperature, high voltage entrance bushing assembly which is sufficiently compact so that it can be shop assembled, tested, shipped and installed as a unit.

It is a further object of this invention to provide an improved high-pressure end for such a high pressure, high temperature, high voltage entrance bushing assembly.

It is an additional object of this invention to provide a system for resolving emulsions which include a treating vessel containing electrodes and an improved high pressure, high temperature, high voltage entrance bushing assembly.

SUMMARY OF THE INVENTION

The above and other objects of the invention are achieved by providing a high pressure, high temperature, high voltage entrance bushing assembly having a high temperature member generally similar to that of U.S. Pat. No. 3,926,774, as above described. However, instead of the feed-through insulator of that patent, a high pressure member is employed comprising (a) a generally cylindrical metal housing, internally threaded at one end and closed at the other end except for a central opening adapted to permit an electrical cable to pass through, the housing being tapered internally in a direction away from the threaded end; (b) a closely fitting generally tubular plug member inside the housing, formed of a high electrical resistance plastic material and tapered externally to match the taper in the housing, the tubular member having a central axial passageway extending its entire length and consisting of a first portion and a third portion each adapted to receive an electrical cable, and a second portion intermediate said first and third portions; (c) an electrical conductor contained within the second portion in a fluid-tight manner and adapted to be connected to electrical cables at each end; (d) an externally threaded metal closure member engaging the interior threads of the housing and having a central axial opening adapted to permit an electrical cable to pass through; and (e) resilient means positioned between and held in compression by the closure member and the generally tubular plastic member. The resilient means (e) may comprise a spring washer or a coil spring and the electrical conductor (c) may be a brass screw threaded into the second portion of the central axial passageway and having a central axial bore at each end. Instead of a brass screw, a screw of any electrically conductive metal, such as steel, copper, silver, gold, etc., may be substituted. The screw may be replaced with a tapered conductor. For purposes of attaching the high pressure member to other parts of the overall system, a flange may be secured to the threaded end of the housing and an end cap with a threaded central axial opening secured to the other end of the housing, such threaded opening being adapted to be joined to a threaded pipe or union.

The complete high pressure, high temperature, high voltage entrance bushing of this invention includes, in addition to the described high pressure member, a high temperature member generally similar to that of U.S. Pat. No. 3,926,774. Such high temperature member has at one end an elongated tubular member with an external sidewall surface adapted for immersion in a body of liquid, such tubular member being formed of a high electrical resistance plastic material subject to plastic flow upon increase in temperature and pressure. The other end of this tubular member is carried in a metal adapter member adapted to be mounted in the side wall of a vessel containing the body of liquid. Heat sink means are associated with the adapter for maintaining the tubular member and vessel at substantially the same temperature during operation at elevated temperature of the system of which the entrance bushing is part. High pressure conduit means concentric with and spaced apart from the adapter extend between and in fluid-tight relationship with the upper portion of the adapter and the bottom of the high pressure member. An electrical cable means is connected at one end to the lower portion of the electrical conductor contained within the second portion of the central axial passage extending through the tubular member of the high pressure member. Such cable means extends axially through the high pressure conduit means and through the high temperature bushing member and is connected at its lower end to electrical connecting means carried at the lower end of that bushing.

The present high pressure, high temperature, high voltage entrance bushing is primarily intended for use in a system for electrically resolving emulsions in a high-temperature, high pressure environment, which includes, in addition to the entrance bushing, a pressure vessel for containing the emulsion to be resolved. The adapter of the high temperature bushing member is mounted in the sidewall of the vessel, the tubular member of that bushing member extending into the interior of the vessel with the electrical connecting means at its vessel interior end. Within the vessel are electrode means for promoting the resolution of emulsions, including an energizable electrode mounted in electrical isolation from the vessel and connected to the electrical connecting means at the end of the tubular member of the high temperature bushing member. Within the high pressure conduit is a dielectric liquid which is maintained at substantially the same pressure as the emulsion being treated by means of a system including a dynamic fluid barrier for preventing intermingling of the emulsion and dielectric liquid while equalizing the pressure. Electrical cable means are connected at one end to the upper portion of the electrical conductor within the second portion of the central axial passageway of the high pressure bushing member, and are adapted to be connected at its other end to a high voltage external power source. Conduit means is provided in fluid-tight relationship at one end with the top of the high pressure bushing member and adapted to be connected at its other end in fluid-tight relationship with the high voltage external power source. The electrical cable means extends through the conduit means in electrical isolation therefrom.

The use of spring loading along with the taper seal assures that the taper connections of the high pressure entrance bushing member of this invention will be in precompression for a proper high pressure fluid-tight seal. Furthermore the taper connections accommodate to dimensional changes caused by temperature variations.

The high voltage, high pressure, high temperature entrance bushing assembly of this invention is sufficiently compact so that it can be shop assembled, tested, shipped and installed as a unit.

The term, "emulsion", as used herein, is not restricted to those wherein a liquid is dispersed in a liquid, but includes those containing solids, e.g. wherein the disperse phase consists of solids.

DESCRIPTION OF SPECIFIC EMBODIMENT

Figure 1:
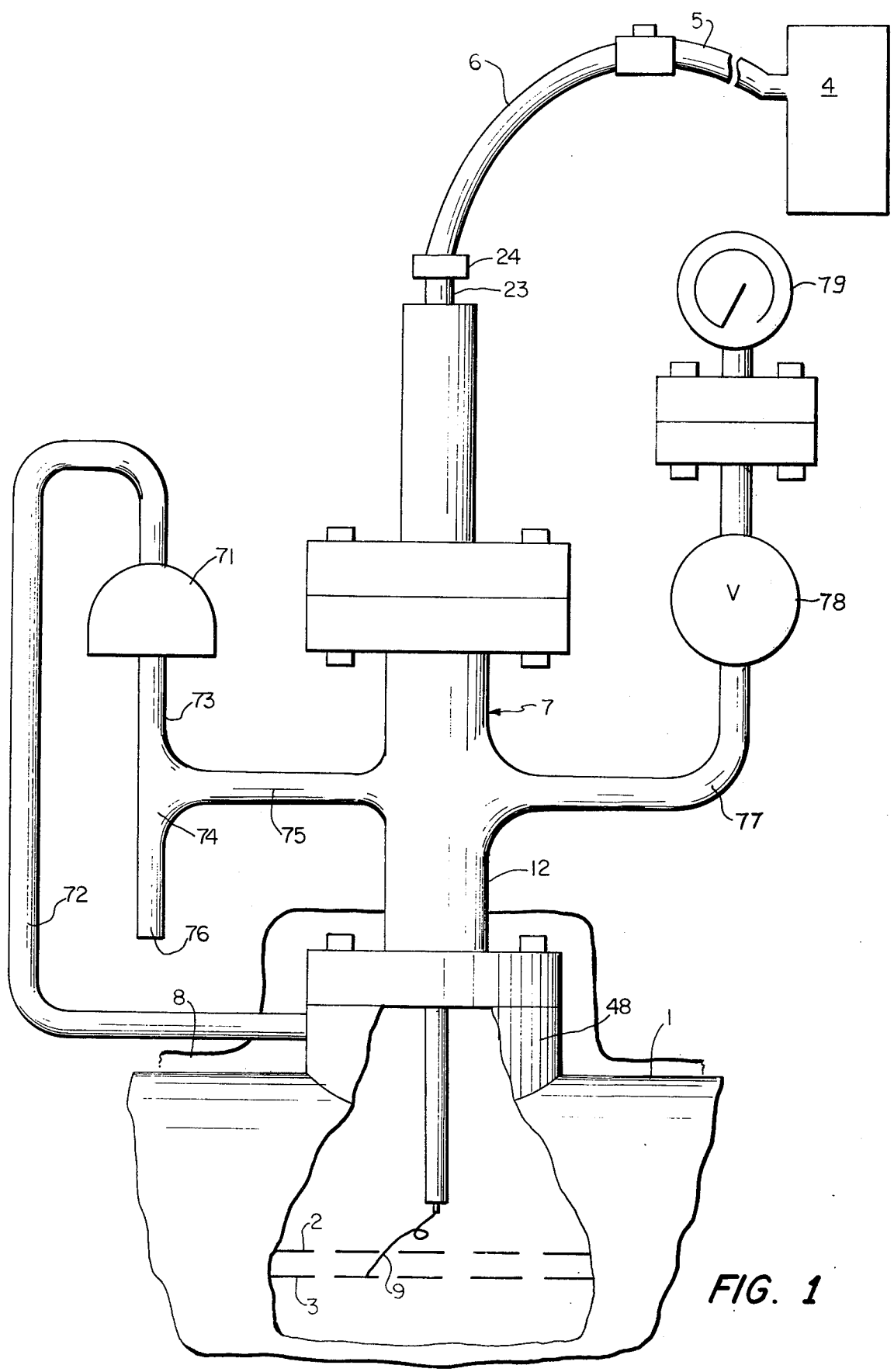
FIG. 1 is a view in elevation, partially in cross-section, of an electric treating system of the present invention.

Referring to FIG. 1 of the drawings, there is shown schematically a system of the present invention for electrically treating an emulsion for its resolution through application of electrical field forces. The electric treating system includes a pressure vessel 1 which contains the emulsion at suitable temperature and pressure during resolution. The vessel 1 encloses electrodes 2 and 3, which may take any suitable configuration but preferably are planar, spaced apart foraminous metal grids. The sidewalls of vessel 1 carry thermal insulation 8. As shown, the electrode 2 is grounded to vessel 1 while electrode 3 is energized and is carried in electrical isolation relative to the metal portions of the vessel. The energized electrode 3 can be suspended from vessel 1 upon insulators, not shown. Vessel 1 may be of conventional design with inlet and outlet conduits, not shown, for bringing emulsion into the vessel and for removing the coalesced internal phase. A vessel suitable for use with the present invention is shown in U.S. Pat. No. 2,855,359.

The energized electrode 3 receives high potential current from an external power source 4, which may be a d.c. power pack which produces elevated potentials, e.g. 33 kv. d.c., or may be a transformer energized from available a.c. supply sources with an output of suitable magnitude, e.g. 13 kv a.c. The high potential current from power source 4 is carried through conduits 5 and 6, which are filled with a dielectric liquid, to an entrance bushing designated generally as 7, which passes the current, in electrical isolation from vessel 1, through flexible lead 9 to energized electrodoe 3. Electrode 3, thus energized to elevated potentials, creates an electric field within vessel 1 for resolving the emulsion.

Figure 2A:
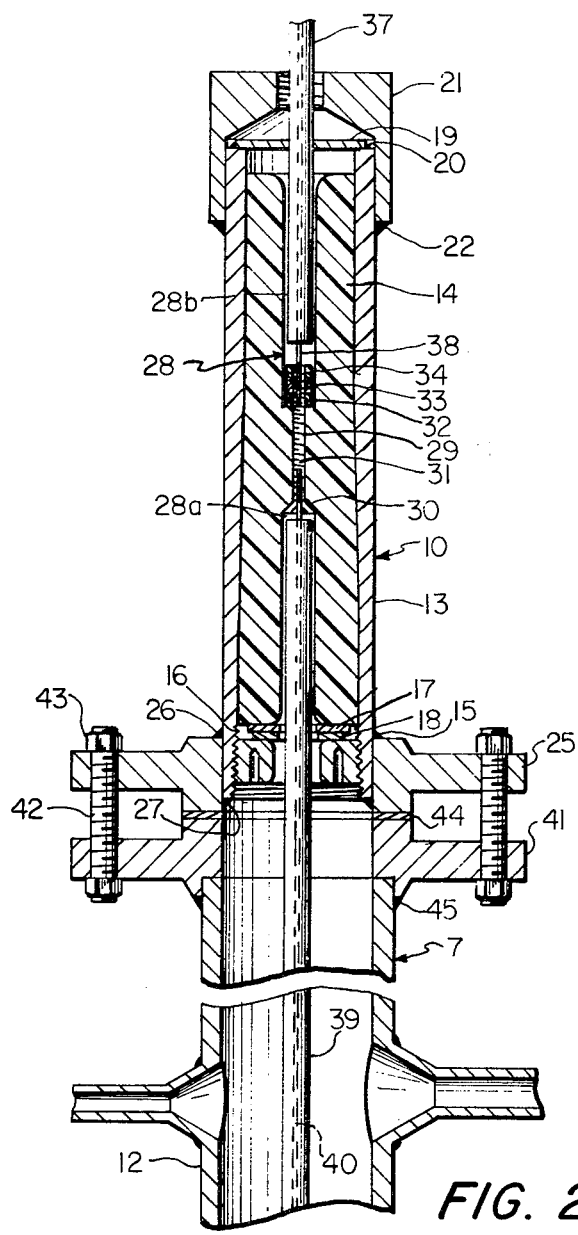
FIG. 2A is a vertical section of the upper portion of one embodiment of an entrance bushing carried in an electric treater.
Figure 2B:
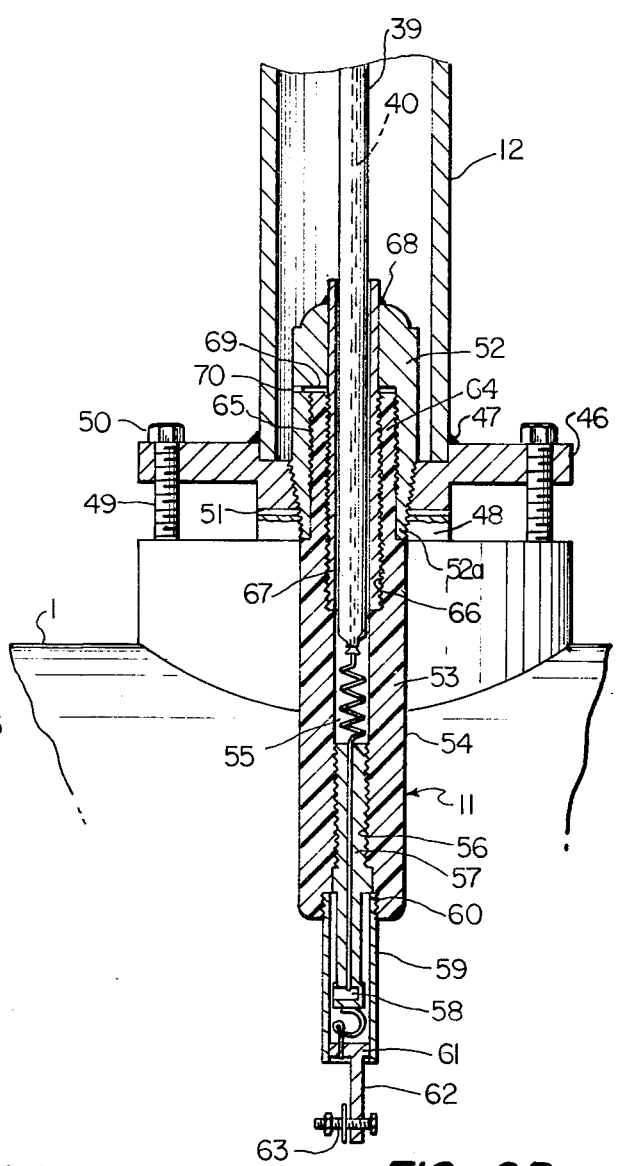
FIG. 2B is a vertical section of the lower portion of an entrance bushing carried in an electric treater.

FIGS. 2A and 2B show the preferred embodiment of the entrance bushing 7 in greater detail. Entrance bushing 7 consists of a high pressure end or member generally designated as 10 and a high temperature end or member designated generally as 11, these being joined by metal pressure conduit 12, which is filled with a dielectric fluid such as Dow Corning 200 fluid. High pressure end 10 comprises a tapered metal barrel or housing 13 and a polytetrafluoroethylene, e.g. Teflon tubular member or plug 14 tapered to fit barrel 13, the taper being away from the direction of vessel 1, i.e., in an upward direction. A No. 5 Morse taper (i.e. 0.6315 in. per ft.) in an intermediate portion of said barrel 13 and plug 14 is suitably used. Teflon plug 14 is secured in barrel 13 by externally threaded member 15 which screws into a corresponding internally threaded end portion 16 of barrel 13. Instead of polytetrafluoroethylene, plug 15 may be formed of other suitable high electrical resistance, plastic insulating material. A flat washer 17 and spring lock washer 18 are positioned between member 15 and plug 14 and serve to impart spring pressure to the plug when member 15 is secured. The lock washer 18 must be flat after the bushing is assembled.

A washer 19 is positioned across the upper end of barrel 13 and welded thereto by means of weld 20 and an end cap 21 is welded to said barrel by means of weld 22. The end cap 20 is internally threaded at its upper end to receive connecting member 23, shown in FIG. 1, which in turn is joined to conduit 6 by means of union 24. The lower end of barrel 13 fits into slip flange 25 and is secured thereto by means of welds 26 and 27.

Figure 3:
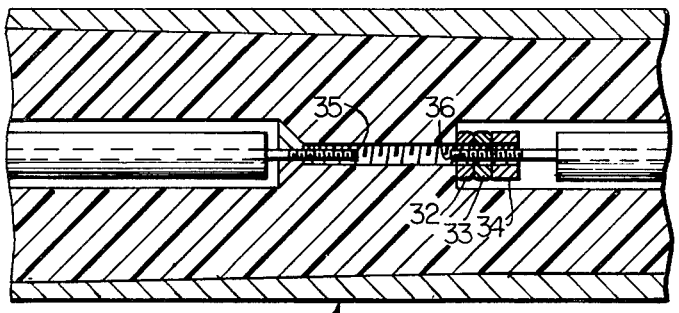
FIG. 3 is a vertical section showing more clearly certain details of FIG. 2A.

Teflon plug 14 has a central longitudinal passage 28 of circular cross section extending between its top and bottom extremities. The intermediate portion 29 of said passage is of reduced diameter and threaded. A conical transition passage 30 joins the lower part of said threaded middle portion 29 and the lower portion 28a of longitudinal passage 28. A brass screw 31 is positioned in middle portion 29 with its head seated in the conical transition passage 30. As shown on a large scale in FIG. 3, the brass screw 31 is secured by flat washer 32, lock washer 33 and nut 34, positioned in the lower part of the upper portion 28b of longitudinal passage 28. The brass screw 31 has threaded central longitudinal passages 35 and 36 at each end, these not being joined. An insulated high voltage cable 37, with an electrical conductor 38 encased within a plastic sheath and leading from power source 4 through conduits 5 and 6, is positioned in the upper longitudinal passageway 28b of Teflon plug 14. The plastic sheath may be of a material similar to that of plug 14, e.g. Teflon. However, the sheath may be formed of other materials capable of resisting dielectric puncture at the high voltages which prevail. A threaded uninsulated end of conductor 38 extends from cable 37 and is threaded into the internal longitudinal passage 36 of brass screw 31. Similarly, an insulated high voltage cable 39, with an electrical conductor 40 encased within a plastic sheath as described for cable 37 and leading to the high temperature end 11 of the entrance bushing through high pressure conduit 12 is positioned in the lower longitudinal passage 28a of Teflon plug 14. A threaded uninsulated end of conductor 40 extends from cable 39 and is threaded into the internal longitudinal passage 35 of brass screw 31. Instead of threaded connections, the uninsulated ends of conductors 38 and 40 may be secured electrically to screw 31 in other suitable fashion.

The upper end of high pressure conduit 12 fits into a slip-on flange 41 and is secured thereto by weld 45. Flange 41 is secured to flange 25 by bolts 42 and nuts 43, a gasket 44 being positioned between the opposing faces of the flanges.

The lower end of high pressure conduit 12 terminates at flange 46, to which it is secured by weld 47. Flange 46 is secured to an entrance port flange 48 of vessel 1 by means of studs 49 and nuts 50, a gasket 51 being positioned between the opposing faces of flange 46 and entrance port flange 48. Other conventional means of securing a conduit to a vessel may be employed.

The high temperature end 11 of the entrance bushing, generally similar to that of U.S. Pat. No. 3,926,774, as shown in FIG. 2b has a metal adapter 52 secured to flange 46 and to vessel 1 through mating entrance port flange 48 of vessel 1. For this purpose, the adapter 52 may have a lower extremity 52a received within complementary threads in flanges 46 and 48. The upper portion of the adapter 52 is housed in concentric relationship with the high pressure conduit 12, but spaced apart from the walls thereof. An elongated tubular member 53 projects from the metal adapter 52 into the interior of vessel 1. The tubular member 53 is formed of polytetrafluoroethylene, e.g. Teflon, although other high electrical resistance, plastic insulating materials may be employed, as described above in connection with plug 15. Preferably a polymeric solid not readily wetted by the emulsion or accumulating deposits of arc inducing materials is employed. In less severe environmental conditions polytrifluorochloroethylene; e.g. Kel-F may be employed.

Preferably, the tubular member 53 has a uniform cylindrical exterior surface 54 which is relatively free of scratches or ridges that promote accumulations of arc inducing materials. The tubular member 53 has a central longitudinal passage 55 of circular cross-section extending between its top and bottom extremities. The passage 55 accommodates the high voltage cable 39. The lower extremity of the tubular member 53 is provided with a first threaded portion 56 in which is received a metal sleeve 57. The metal sleeve 57 has a complementary passageway for the conductor 40 which is secured electrically to the sleeve 57 by silver solder 58. The solder 58 also provides a fluid-tight seal at the bottom of the sleeve 57.

The sleeve 57 is mounted within the threaded portion 56 in a fluid-tight connection to withstand moderate pressure differentials. A relatively durable seal to even elevated pressure differentials is provided by first wrapping the sleeve 57 with a very thin Teflon tape. The sleeve 57 is cooled and the tubular member is heated, and then, these parts are threaded together. Lastly, dielectric heating fuses the tape between the threaded portion 56 and the sleeve 57 to form an excellent high pressure fluid seal. Reference to U.S. Pat. No. 3,666,878 provides a complete description of such seal manufacture. The lower portion of the tubular member 53 is completely immersed in emulsion and is maintained throughout its extent adjacent the sleeve 57 at a substantially uniform temperature (no significant thermal gradient). Thus, no thermal stress created by differential longitudinal expansion exists along the threaded interconnection between the sleeve 57 and the tubular member 53.

The lead 9 could be secured directly to the end of the sleeve 57. However, it is preferred to protect the sleeve 57 with an enclosing sleeve 59 mounted in a second threaded portion 60 provided in the tubular member 53. The enclosing sleeve 59 and threaded portion 60 interconnection need not provide a fluid tight seal. The lower end of the enclosing sleeve 59 is closed by a cylindrical insert 61 secured in place, as by welding. The insert 61 has a projecting lug 62 carrying a bolt and washer assembly 63 for connection to the lead 9.

In the conventional bushing, the end of the tubular member 53 at the vessel 1 is cooled by the external conduits connected thereto. As a result, the upper end of the tubular member 53 is under a longitudinal thermal gradient which can disrupt fluid pressure seals. In the present system, the adapter 52 is arranged with a heat sink so that the entire upper portion of the tubular member 53 is maintained at substantially the same temperature as the emulsion contained in the vessel 1. For this purpose, the upper portion 64 of the tubular member 53 carries external threads which inter-fit with internal threads 65 carried within the interior of threaded portion 52a of the metal adapter 52. An enlarged cylindrical threaded portion 66 about the passageway 55 receives a metal sleeve 67 which extends beyond the adapter 52 into the upper portion of the tubular member 53. The sleeve 67 is secured to the metal adapter by suitable means which provide for an efficient transfer of heat, and preferably, a fluid-tight metal-to-metal connection. For example, these components can be secured integrally into metal-to-metal contact by an induction weld 68. With this arrangement, the sidewall of the insulated vessel 1 is at substantially the same temperature as the emulsion contained therein. Heat energy can flow through the heat sink provided by metal-to-metal integral connection of the adapter 52 and sleeve 67 about the upper end of the tubular member 53. As a result, the tubular member 53 is without significant longitudinally directed temperature gradients. The insulation 8 preferably is carried about the entrance bushing.

The sleeve 67 is mounted within the tubular member 53 to provide a pressure seal. If desired, the sleeve 67 is secured to the tubular member 53 in the same manner as the sleeve 57 in a fluid-tight interconnection through the use of a plastic tape which is fused to form the desired pressure seal. The induction weld 68 may generate a sufficient temperature at the top end of the tubular member 53 to generate a small amount of gas. The gas is vented to the exterior of the metal adapter 52 by a vent port 69. The vent port 69 is closed upon completion of the fabrication by a small welded plug 70.

Other arrangements of the metal adapter 52 in the high temperature end 11 may be employed in order to provide a heat conductive element around the tubular member 53. Preferably, the opening in the metal adapter 52 accommodating the cable 39 is the sole aperature through such heat conductive element.

As in U.S. Pat. No. 3,926,774, a system is provided for maintaining the dielectric liquid within the high pressure conduit 12 at substantially the same pressure as the emulsion within the vessel 1, while preventing the emulsion from reaching pressure conduit 12. In this system, a dynamic fluid barrier 71 is in fluid communication with the emulsion in vessel 1 and the dielectric liquid within the pressure conduit 12. For this purpose, the barrier 71 has an inlet conduit 72 connected to vessel 1, as by a passageway, not shown, through entrance port flange 48, the function of conduit 72 being to sense the pressure within vessel 1. An outlet conduit 73 from the barrier 71 connects by a tee 74 and conduit 75 to pressure conduit 12 for applying fluid pressure to the dielectric liquid. Preferably, the tee 74 connects, by way of conduit 76 to a valve, not shown, to permit filling of the barrier 71 and pressure conduit 12 with dielectric liquid.

The barrier 71 can have a variety of elements as long as these elements prevent the intermingling of the emulsion and dielectric liquids while transmitting the emulsion's pressure in the vessel 1 to the dielectric liquid within the pressure conduit 12. Preferably the barrier 71 includes an impermeable fluid barrier displaceable by pressure differential for isolating the emulsion and the dielectric liquid while transmitting fluid pressure from the emulsion to the dielectric liquid. With this system, the dielectric liquid within the pressure conduit 12 is maintained at substantially the emulsion's pressure within the vessel 1. The impermeable fluid barrier may be provided by various elements such as free pistons, immiscible liquid barriers or by flexible bellows. Preferably, the barrier 71 is that marketed under the trademark Hydropod, which is made of stainless steel and is pleated and expands or contracts like a silphon bellows. This barrier gives more volume for fluid expansion with temperature increase than a flexible diaphragm. Another type of barrier which may be employed is that shown in FIG. 3 of U.S. Pat. No. 3,926,774.

The pressure of the dielectric liquid in the high pressure conduit 12 may be ascertained by means of a gage 79, connected to a conduit 77 by way of a valve 78. Conduit 77 is connected to high pressure conduit 12 by a T-connection.

In the foregoing description of the invention, it will be understood that since the present bushing assembly will normally be installed in a vertical position, the terms, "upper" and "lower" refer to the relative positions of the bushing members with respect to the vessel 1, i.e., the high pressure end 10 is at the upper end and the high temperature end 11 at the lower end of the overall bushing assembly. However, the bushing assembly may, in appropriate circumstances be installed in other than a vertical position.

From the foregoing, it will be apparent that there has been provided a system for electrical resolution of emulsions which is well adapted to satisfy the objects of the present invention. Various changes may be made to the system without departing from the spirit and scope of this invention. The foregoing description and the drawings are to be taken as illustrative of the present invention, but the invention is limited only as indicated in the appended claims.

I claim:

1. A high pressure, high voltage entrance bushing member comprising:
    (a) a generally cylindrical metal housing, internally threaded at one end and closed at the other end except for a central opening adapted to permit an electrical cable to pass through, said housing being tapered internally in a direction away from said threaded end;
    (b) a closely fitting generally tubular plug member inside said housing, said tubular member being formed of a high electrical resistance plastic material and tapered externally to match the taper in said housing, said tubular member having a central axial passageway extending its entire length, and consisting of a first portion and a third portion, each said portion being adapted to receive an electrical cable, and a second portion intermediate said first and third portions;
    (c) an electrical conductor contained within said second portion in a fluid-tight manner; said conductor being adapted to be connected to electrical cables at each end;
    (d) an externally threaded metal closure member engaging the interior threads of said housing and having a central axial opening adapted to permit an electrical cable to pass through; and
    (e) resilient means intermediate said closure member and said generally tubular plastic member, said resilient means being held in compression by said members.

2. The high pressure, high voltage entrance bushing member of claim 1, wherein said resilient means comprise a spring washer.

3. The high pressure, high voltage entrance bushing of claim 1 wherein said electrical conductor (c) is a brass screw threaded into said second portion of said central axial passageway and having a central axial bore at each end thereof.

4. The high pressure, high voltage entrance bushing member of claim 1, wherein a flange is secured to said housing at the threaded end thereof and an end cap with a threaded central axial opening is secured to said housing at its other end, said central axial opening being adapted to be joined to a threaded pipe or union.

5. A high pressure, high temperature, high voltage entrance bushing comprising:
    (a) the high pressure, high voltage bushing member of claim 1;
    (b) a high temperature, high voltage entrance bushing member having at one end an elongated tubular member with an external sidewall surface adapted for immersion in a body of liquid, said tubular member being formed of a high electrical resistance plastic material subject to plastic flow upon increase in temperature and pressure, said tubular member at its other end being carried in a metal adapter member adapted to be mounted in the sidewall of a vessel containing such body of liquid, heat sink means being associated with said metal adapter member for maintaining said tubular member and vessel at substantially the same temperature during operation of said vessel at an elevated temperature;
    (c) high pressure conduit means concentric with and spaced apart from said adapter member, said conduit means extending between and in fluid-tight relationship with the upper portion of said adapter member and the bottom of said high pressure, high voltage bushing member;
    (d) electrical cable means connected at one end to the lower portion of said electrical conductor contained within said second portion of said central axial passageway extending through said tubular member of said high pressure, high voltage entrance bushing member, said electrical cable means extending axially through said high pressure conduit means and through said high temperature, high voltage entrance bushing member and connected at its lower end to electrical connecting means carried at the lower end of said high temperature, high voltage bushing member.

6. A system for electrically treating emulsions comprising:
    (a) the high pressure, high temperature, high voltage entrance bushing of claim 5;
    (b) a vessel for containing such an emulsion while subjected to resolution forces; said adapter member of said high temperature, high voltage entrance bushing member being mounted in the sidewall of said vessel, and said tubular member of said high temperature, high voltage entrance bushing member carrying said electrical connecting means extending into the interior of said vessel;
    (c) electrode means for creating an electric field for promoting emulsion resolution within said vessel, said electrode means including an energizable electrode mounted in electrical isolation from said vessel, said energizable electrode being connected to said electrical connecting means at the vessel interior end of said tubular member;
    (d) a dielectric liquid within said high pressure conduit;
    (e) system means for maintaining said dielectric liquid at substantially the same pressure as the emulsion being treated, said system including a dynamic fluid barrier for preventing intermingling of the emulsion and dielectric liquid;
    (f) electrical cable means connected at one end to the upper portion of said electrical conductor within said second portion of said central axial passageway extending through said tubular plug member of said high pressure, high voltage entrance bushing member and adapted to be connected at the other end to a high voltage external power source; and
    (g) conduit means in fluid-tight relationship at one end thereof with the top of said high pressure, high voltage entrance bushing member and adapted to be connected at its other end in fluid-tight relationship with said high voltage external power source, said electrical cable means (f) extending through said conduit means in electrical isolation therefrom.

* * * * *